Aug. 24, 1965  J. S. GOLIGHTLY ETAL  3,202,496
APPARATUS FOR BENDING GLASS SHEETS WITH HEAT ABSORBERS
Filed March 30, 1961  3 Sheets-Sheet 1

INVENTORS
HAROLD E. McKELVEY and
BY JAMES S. GOLIGHTLY

Oscar L. Spencer
ATTORNEY

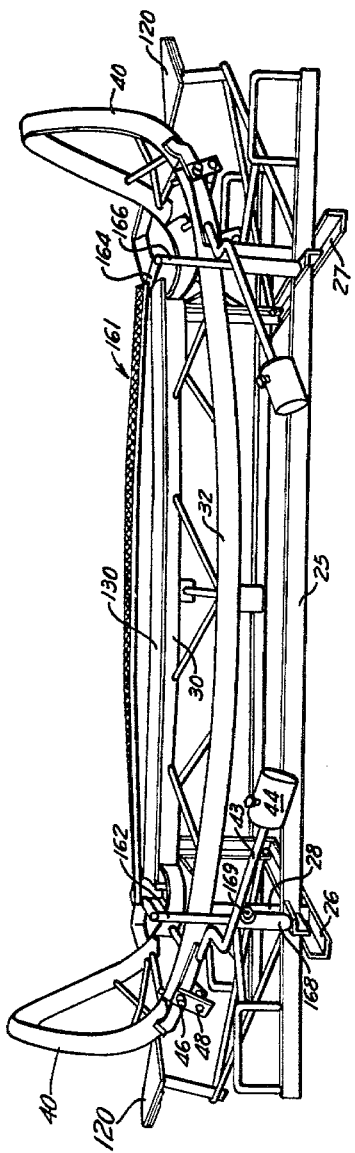

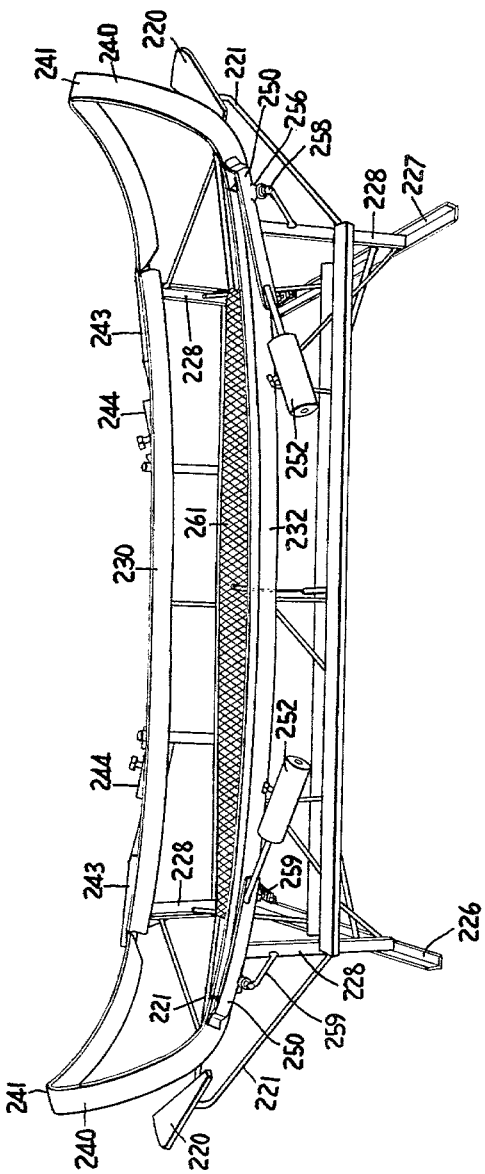

United States Patent Office 3,202,496
Patented Aug. 24, 1965

3,202,496
APPARATUS FOR BENDING GLASS SHEETS
WITH HEAT ABSORBERS
James S. Golightly, Fox Chapel, and Harold E. McKelvey, New Kensington, Pa., assignors to Pittsburgh Plate Glass Company, Pittsburgh, Pa., a corporation of Pennsylvania
Filed Mar. 30, 1961, Ser. No. 99,629
5 Claims. (Cl. 65—288)

The present application is a continuation-in-part of application Serial No. 531,462, filed August 30, 1955, for Method and Apparatus for Bending Glass Sheets to Compound Curvatures, now abandoned, and application Serial No. 588,832, filed June 1, 1956, for Apparatus for Bending Glass Sheets to Compound Curvatures now abandoned.

The present application is concerned with particular bending molds especially suitable for producing bent glass sheets having certain areas bent sharply while other areas are maintained relatively flat. The present invention provides such a result by a novel combination of a skeleton bending mold having an upper shaping surface adapted to conform in elevation and outline to the shape desired for the periphery of bent glass sheets with a heat absorbing member of special construction aligned with a portion of the area included within the mold shaping surface wherein the glass is to be maintained relatively flat.

The use of solid plates as heat screens for glass bending molds to be interposed between the source of heat and a portion of a sheet of glass to be bent to complex curvatures is admittedly old. Such devices are shown in the Pearse et al. Patent No. 2,450,297, Paddock et al. Patent No. 2,452,488, and Bamford et al. Patent No. 2,646,647. Such solid shields are interposed between the source of heat in a bending lehr and a portion of a sheet of glass which is to be kept relatively flat while other portions are bent. Heating the glass to glass softening temperatures at which the glass can be bent must be decelerated to permit some thermal conductivity from the unshielded to shielded areas when solid shields are used. Otherwise, the glass is subjected to a steep temperature gradient which establishes internal stresses tending to fracture the glass.

Surprisingly, it has been discovered that less breakage occurs in bending if heat absorber members composed of open mesh or expanded metal screens of given area and thickness having a smaller surface area than that of solid heat absorber members of the same area and thickness are substituted for solid members in certain locations relative to the mold shaping surface. Apertured heat absorber members according to the present invention have a smaller effect on the change of temperature of the adjacent glass sheet portion than that of solid members of the same area and thickness and material. Therefore, when apertured heat absorbers of the type suggested by the present invention are used instead of solid absorbers, the glass may be heated more rapidly than before without causing fracture. With such modified equipment, the glass areas exposed directly to thermal radiation are capable of being heated rapidly to glass softening temperatures, while the other glass areas which are aligned with the apertured absorbers are heated less rapidly to a temperature slightly below the glass softening temperature. Thus, the thermal differential between the shielded and unshielded portion is not so great using open mesh members as to impose stresses which tend to fracture the glass when solid members are employed under the same conditions.

Molds constructed according to the present invention may be transported through a bending lehr at a rapid rate relative to the rates possible with molds containing solid shields such as disclosed in the patents mentioned above. Therefore, shorter lehrs may be employed to bend glass more rapidly when molds provided with open mesh or expanded metal screens are used than when molds provided with solid shields are used to bend glass sheets.

The present invention also uses improved wire or expanded metal heat abstractors that are mounted on a mold below its glass support plane. In this embodiment, the heat abstractors are aligned with one or more portions of the glass sheet that are desired to be kept relatively flat compared to the other areas to be curbed.

A primary object of the present invention is to provide improved apparatus for bending glass sheets to complex curvatures.

Another object of the present invention is to provide apparatus for bending glass wherein an open mesh or expanded metal screen member is utilized to moderate the intensity of heat directed to only certain predetermined areas of the glass which are desired to be maintained substantially flat while simultaneously bending other areas of the glass wherein the intensity of heat applied is not moderated. This apparatus may also employ solid heat absorber members in combination therewith to help keep other areas flat, particularly in regions where the glass portions adjacent the solid members are moved away from the solid members during bending.

These and other objects of the present invention will become apparent upon the study of the description of a particular embodiment of the present invention.

In the drawings which accompany the following description,

FIGURE 2 is an elevational view partially in perspective of the mold shown in FIGURE 1.

FIGURE 3 is a view similar to FIGURE 2 of an alternate embodiment of the present invention showing the heat absorbing member positioned below the bending mold.

Figure 1:
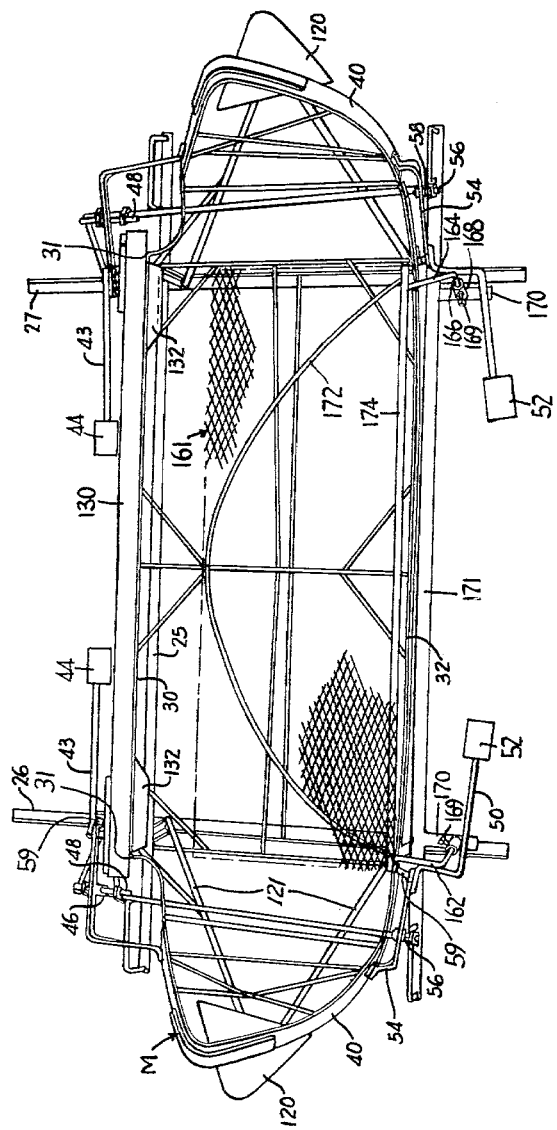
FIGURE 1 is a plan view of one embodiment of a sectionalized mold in the closed position, wherein the mold is provided with a heat absorbing member in the form of an expanded metal screen located above a part of the area enclosed by the mold shaping surface according to one teaching of the present invention.

Referring to FIGURES 1 and 2, support structure for a sectionalized mold M comprises spaced longitudinally extending support rails intersected by cross rails 26 and 27. All these support rails are fabricated of elongated angle irons. Vertical posts 28 are connected at their bottoms to the cross rails 26 to support the undersurface of spaced, longitudinally extending curved rails 30 and 32 which comprise a center mold section. Side rails 30 and 32 are curved at their upper surfaces to conform to the outline of the two side margins desired for a bent glass sheet.

Side rail 30 is shaped along its length to support the margin of a side portion of the glass that is destined to be bent transversely of the main body of the sheet and extends rearwardly along the automobile roof. Therefore, it includes reversely curved corners 31. Side rail 32 supports the central portion of the margin of the sheet that forms the bottom of the vehicle closure, and therefore is smoothly curved along its length.

Outboard molding members 40 are provided at the longitudinal extremities of the mold M. In the closed mold position shown in FIGURES 1 and 2, each outboard molding member extends in generally C-shaped configuration from adjacent a longitudinal extremity of rail 30 to adjacent the laterally opposing longitudinal extremity of rail 32. Counterweighted arms are attached to each inboard extremity.

Each counterweighted arm 43 attached to the front side of the mold as seen in FIGURE 2 is provided with a counterweight 44 at its inboard extremity. The counterweighted lever arm also includes an ear 46 forming a hinge connection with a stub hinge rod 48 carried by a strap 49 extending downwardly from each extremity of center rail 32. At the other side of the mold, the inboard extremity of each outboard molding member is connected to a counterweighted lever arm 50 provided with counterweights 52 by means of an angular connecting strip 54. The latter is provided with an ear 56 to receive a stub hinge rod 58 fixed to each extremity of the other center rail 30. Thus, laterally opposing stub hinge rods 48 and 58 define axes of rotation for the outboard molding members.

Outboard molding members 40 are rotatable about these axes of rotation to a spread mold position relative to the rails 30 and 32 which are fixed to the support structure. In this spread position, the mold extremities support extremities of flat sheets of glass prior to bending. Weights 44 and 52 cause the outboard molding members 40 to rotate about the stub hinge rods 48 and 58 into a closed mold position wherein rails 30 and 32 and outboard molding members 40 provide a substantially continuous frame conforming in both elevation and outline to the shape desired for the bent glass sheet. Stops 59 extending from the fixed mold support structures prevent rotation of the outboard members beyond their desired closed mold position upon engagement by the counterweighted arms.

Similarly, heat abstractor plates or ballast members 120, which are an invention of James S. Golightly described and claimed in application Serial No. 735,736, filed May 16, 1958 now abandoned, which is a continuation-in-part of application Serial No. 438,016, filed June 21, 1954, now U.S. Patent No. 2,876,595, may be fixed to the mold support structure by braces 121. The ballast members are located underneath the outboard extremity of each outboard molding member assuming the spread mold position.

Since the extremities of the glass sheets converge in width, they tend to heat more rapidly than the wider intermediate portions of the sheets. This tendency is more than overcome by virtue of the proximity of the ballast members 120. Ballast members 120 are preferably solid metal to abstract a high proportion of the heat applied to the tapered extremities of the flat glass sheet during the early phase of the heating cycle. As the other areas of the glass reach softening temperature, outboard molding members 40 are rotated by the counterweighted arms to lift the glass extremities from adjacent the ballast members 120. The moderating effect of the ballast members on the temperature increase of the extremities decreases toward the end of the bending cycle, thus enabling the temperature of the glass tips to approach that of the bent portions. However, the loaded mold is conveyed into a region where the bent glass is cooled before the tips reach softening temperatures.

A cantilever structure supports a heat absorbing member 161 of open mesh configuration such as a screen or expanded metal. The screen is located above the side of the mold opposite that containing the smoothly surfaced rigid sheet 130. The cantilever structure includes a pair of spaced angle bars 162 each having a horizontal portion 164 and a vertical portion 166. The vertical portions are locked by lock nuts 169 within a pipe 168 carried by a support lug 170 fixed to rail 171 of the mold support structure. The screen 161 is reinforced by an arcuate reinforcement 172 whose ends are interconnected by a beam or bar 174. Horizontal portions 164 are secured to beam or bar 174 by welding to support the latter.

The open mesh wire screen 161 is preferably compoesd of an expanded metal such as steel. Expanded metal is slit and expanded to form stiff mesh of light weight having diamond or square shaped apertures. While the degree of expansion varies for different curvature variations and the dimensions of the sheets to be curved, experience has taught that the apertures of the screen should be an appreciable portion of the area of the screen in order to obtain the benefits of the present invention.

In using a structure such as described above, the flat glass is first mounted on the spread mold and then the open mesh screen structure is attached to the mold structure by inserting vertical portions 166 into the pipes 168 and securing them by tightening the lock nuts 169.

The glass loaded mold is then conveyed through a bending lehr where the glass and the mold are subjected to increasing temperatures. As the glass laden mold reaches the portion of the lehr wherein the lehr temperature reaches the softening point of glass, all the glass sheet except that immediately adjacent the screen 161 and the extremities whose heating has been decelerated by their proximity to the ballast members 120 early in the bending cycle is softened and sags to conform to the curvature defined by the upper shaping surfaces of the mold.

Counterweights 44 and 52 cause the outboard molding members 40 to rotate, thereby lifting the longitudinal extremities of the glass sheet. The central side portion of the glass sheet spaced from the screen 161 and supported on the smoothly surfaced sheet 130 slides thereon as the exposed portion sags by gravity to form a transverse curve. The portion of the glass immediately facing the screen 161 is maintained at a temperature close enough to the softening point of glass to avoid thermal shock between this region and the relatively intensely heated regions but sufficiently below the softening point of the glass to maintain its stiffness and its original flat shape. The sheets are removed from the glass softening temperature environment before the extremities and the glass areas adjacent the screen are able to reach the softening point.

The provision of an open mesh work not only selectively absorbs a portion of the heat from the overhead lehr heaters, but also provides a source for reradiation. This reradiation occurs in all directions, and, if the screen is separated sufficiently from the surface of the glass, a diffuse pattern of relatively low intensity radiation impinges onto the adjacent glass surface.

If the screen 161 is maintained too close to the surface of the glass it faces, an undesired criss-cross stress pattern of the screen is imparted to the glass. This pattern results from the uneven thermal effect due to the proximity of the open mesh work relative to the glass sheet. However, it has been found for ⅛ to ¼ inch windshield glass having a length of 70 to 86 inches and a width on the order of 30 inches, that if a screen of expanded steel of 16 gauge having diamond shaped apertures ⅝ inch long and ⁵⁄₁₆ inch wide is maintained a distance in excess of 3 inches above the upper shaping surface of the mold, that this effect is minimized. An acceptable stress pattern results even if such a screen is interposed between the source of overhead heat and the glass, provided the duration of exposure to glass softening temperatures is not substantially in excess of the time required to soften the severely bent portions of the glass sheet. In the expanded metal screen used above, the width of the metal strips averaged ⅜ inch. Thus, the apertures covered about 62 percent of the area of the expanded metal. The area of each aperture of the screen was .098 square inch. The area of the walls surrounding each aperture was only .071 square inch. Therefore, each aperture reduced the effective surface area of the heat absorbing member by .027 square inch compared to that of a solid heat absorbing member.

EXAMPLE I

An expanded steel sheet of 16 gauge metal having diamond shaped apertures of ⁵⁄₁₆ inch across the smaller diagonal and 5/8 inch across the larger diagonal and whose width averaged 3/8 inch provided a satisfactory stress pattern when its minimum distance from the glass was at least 3 inches. About 3/8 of the area was occupied by metal and 5/8 by spacing between the metal.

In the apparatus depicted in FIGURE 3, cross rails 226 and 227 correspond to the cross rails 26 and 27 of the previous embodiment. In this embodiment, vertical posts 228 are interconnected between the cross rails and the undersurface of the longitudinal extending curved rails 230 or 232, whose upper shaping surfaces are curved in a manner heretofore described for the side rails 30 and 32.

While the particular mold shown in this figure is designed for a wrap-around pattern having a complex curvature in the longitudinal dimension only, it is understood that the particular embodiment of heat absorbing member depicted here can be used with molds for bending glass sheets to compound shapes involving both transverse and longitudinal bends wherein one or both bends involve curvature variations. Also, the other embodiments, while shown with molds for producing complex curves in two dimensions, are also suitable for use with molds for providing non-uniform curves along one dimension.

This embodiment also includes outboard molding members 249 provided at the longitudinal extremities of the mold. Since the pattern of glass to be bent is more pointed than the pattern disclosed for the previous embodiment, the outboard molding members 240 are in the form of a modified V having substantially pointed longitudinal extremities 241. Counterweighted arms 243 containing a counterweight 244 at their inboard extremities are attached to the inboard extremity of the outboard molding member. The laterally opposite inboard extremity of each outboard molding member 240 has attached thereto a lever arm 250 counterweighted at 252. Each lever arm 243 and 250 contains an ear 256 to receive a stub hinge rod 258. Braces 259 extend from the vertical post 228 to support the outboard extremities of the hinge rods 258.

Heat abstractor plates or ballast members 220 are fixed to the vertical posts 228 by rods 221. These ballast members behave similarly to the ballast members 120 previously described for the earlier embodiment.

In the present embodiment, a screen 261 of either heavy mesh wire or expanded metal underlies that portion of the center of the mold wherein a transverse bend is not desired in the final bend sheet. In FIGURE 3, this expanded metal member 261 is shown fixed relative to the rail 232 of the center molding member.

The embodiment disclosed in FIGURE 3 is preferred to that shown in FIGURES 1 and 2 because having the expanded metal screen located below the mold rather than above the mold facilitates loading and unloading the glass sheet to be bent without requiring removal of the screen 161 and its appurtenant structure.

The operation of the device shown in FIGURE 3 is similar to those in FIGURES 1 and 2, except that in the devices employing screens below the glass shaping surface of the mold, there is no necessity for removing the screens before loading and unloading.

While certain embodiments of the present invention have been described in detail for purposes of illustration, the present invention is not limited to the specific features recited above, but includes modifications of structure within the scope of the accompanying claims and equivalents thereof.

What is claimed is:

1. A glass bending mold adapted to bend a glass sheet in a hot atmosphere and comprising an upper shaping surface conforming in elevation and outline to the shape of the bent glass sheet, said shaping surface enclosing a relatively flat area portion, and a heat absorbing member of open mesh configuration and of given area and thickness aligned with and spaced from the relatively flat area portion and positioned so as to face a surface of the glass sheet when supported on said shaping surface, said heat absorbing member having a smaller effective surface area than that of a solid member of the same area and thickness by virtue of its open mesh configuration.

2. A glass bending mold as in claim 1, further including a bar positioned inwardly of said shaping surface and closely adjacent a portion thereof, wherein said heat absorbing member of open mesh configuration is positioned in proximity to said bar and inwardly of said bar and said portion of said shaping surface and further including means for mounting said bar and said heat absorbing member of open mesh configuration in the aforesaid relative positions.

3. In apparatus for bending glass sheets into compound curvatures having non-uniform longitudinal curvatures including a relatively flat central area bounded by sharply curved regions to form flat extremities, a sectionalized skeleton bending mold having a center section and wing sections movable relative to said center section into an open mold position for supporting unbent glass sheets thereon, said mold sections each having upper shaping surfaces conforming in elevation and outline to the shape desired for a portion of the periphery of the bent glass sheets, said wing sections being movable into a closed mold position to provide an upper shaping surface conforming in elevation and outline to the shape desired for the periphery of the bent glass sheets, a heat absorbing member fixed to the center mold section and underlying at least a portion of the flat extremity subtended by each wing section in the open mold position, and a heat absorbing member of open mesh configuration aligned with at least a portion of the flat central area.

4. In apparatus as in claim 3, wherein the heat absorbing member of open mesh configuration has a smaller effective surface area than that of a solid member of the same area and thickness.

5. In apparatus as in claim 3, further including a bar positioned inwardly of said shaping surface and closely adjacent a portion thereof, wherein said heat absorbing member of open mesh configuration is positioned in proximity to said bar and inwardly of said bar and said portion of said shaping surface, and further including means for mounting said bar and said heat absorbing member of open mesh configuration in the aforesaid relative positions.

References Cited by the Examiner

UNITED STATES PATENTS

| | | | |
|---|---|---|---|
| 2,348,278 | 5/44 | Boyles et al. | 65—288 |
| 2,348,279 | 5/44 | Boyles et al. | 65—288 |
| 2,876,595 | 3/59 | Golightly et al. | 65—288 |
| 2,903,825 | 9/59 | Richardson | 65—288 |

FOREIGN PATENTS 534,184 10/55 Italy.

DONALL H. SYLVESTER, *Primary Examiner.*

ARTHUR P. KENT, MORRIS O. WOLK, *Examiners.*